3,682,880
PROTEIN FLAVOURING AGENTS PREPARED FROM SYNSEPALUM DULCIFICUM

Jan Nicolaas Brouwer, Gerardus Johannes Henning, and Hendrik van der Wel, Vlaardingen, Netherlands, assignors to Lever Brothers Company, New York, N.Y.
No Drawing. Filed Aug. 6, 1969, Ser. No. 848,108
Claims priority, application Luxembourg, Aug. 7, 1968, 56,660
Int. Cl. A23j 1/00; C07g 7/00
U.S. Cl. 260—112 R                14 Claims

ABSTRACT OF THE DISCLOSURE

Process for solubilising miraculin, the active factor of the berries of Synsepalum dulcificum, by extraction with tannin-binding substances, protamines or water soluble polyamines.

---

The invention relates to processes for the preparation of products with a reduced sour, preferably a sweet, taste which are taken in to the mouth on use and normally have a sour taste. The invention also relates to processes for the production of physiologically acceptable preparations which, when incorporated in the products, at least reduce the sour taste and preferably produce a sweet taste.

Here by products are to be understood both foodstuffs and beverages and also agents for the care of the teeth and the mouth, as well as pharmaceutical substances such as vitamin C and acetylsalicylic acid.

The agents to be added must be physiologically acceptable, i.e. must have no harmful side-effects on the human body when the product containing them is used in the normal way. This means, for example, that for foodstuffs and confectionery they must be edible in the amounts used.

The fruit (berries) of Synsepalum dulcificum (Schum.) Daniell, more recently also known as Richardella dulcifica (Schum. and Thonn) Baehni, are well known in Africa because of their remarkable property that when some of this fruit has been eaten sour foodstuffs and beverages exhibit a sweet taste, although neither the fruit nor concentrates from it are sweet: the juice of the berries has a pH of about 3. Consequently, the indigenous population have given these berries the name of miracle fruit or magic berries. We shall subsequently call this remarkable property "sweetening activity" and the bearer of it "the active factor" or "miraculin."

The plant was first described in 1852 by W. F. Daniell (Pharm. J., 11, pp. 445–448) and later, for example, in 1961 by F. R. Irvine ("Woody Plants of Ghana," Oxford, pp. 596–598). All authors agree that foodstuffs and beverages (e.g. the native sour palm wine) taste sweet after the berries have been chewed. It has now been found that the same effect is obtained when the flesh of the berries, the juice, or concentrates containing the active factor are incorporated in the product. The invention relates to processes for the preparation of products that are taken into the mouth in use and normally have a sour taste which is characterised by the fact that an amount of a physiologically acceptable preparation containing an active factor of the berries of Synsepalum dulcificum which reduces the sour taste or converts it into a sweet taste is incorporated into the product.

Such preparations are, for example, the flesh of the fruit of the seeded berries, their pulp, the fruit juice, concentrates containing the active factor, or the dry active factor itself.

It is possible to start with the fresh seeded fruit, preferably in the form of a pulp. The pulp must be treated immediately, or else the sweetening activity is lost. The sweetening activity is largely lost even when the pulp is freeze-dried. The fruit can be stored and transported without loss of sweetening acivity in the deep-frozen state ($-40$ to $-80°$ C.). Instead of fresh fruit, therefore, it is possible to use deep-frozen fruit and to incorporate its flesh, its pulp, or its juices into the product, or to use the thawed fruit as the starting material for the preparation of concentrates of the active factor.

Concentrates can be prepared according to the process of G. E. Inglett et al. (J. Agr. Food Chem., 13 (1965), pp. 284–287; see also Chem and Eng. News of Sept. 7, 1964, p. 164). According to their process an up to 40-fold concentrate calculated on the whole fresh beries, is obtained. However, the concentrates were obtained by removing various constituents of the pulp by extraction or dialysis with various solvents, the active factor always remaining insoluble. Neither treatment with water or with 5% bicarbonate solution, 5% urea solution, 1% or 5% salt solution, dimethyl sulphoxide, dimethylformamide, or enzymes nor subsequent extraction with solvents with increasing or decreasing polar nature gave solutions of the active factor. Inglett's results have been confirmed.

It has now been found that highly concentrated preparations can be obtained by bringing the active factor into solution. The term solutions also includes colloidal solutions. It has in fact been possible to isolate and characterise the active factor. The invention therefore also relates to processes by means of which the active factor is dissolved out from the fruit pulp and is substantially purified.

The dissolution of the active factor is achieved by bringing the flesh, or if desired the pulp, or seeded fresh or deep-frozen fruit into an aqueous solution of suitable solubilising agents and homogenising.

Suitable solubilising agents fall into two groups:

(1) Compounds which dissolve the active factor in a form having a molecular weight (as determined by gel filtration according to P. Andrews, Biochem. J., 96 (1965), 595–606) of above about 50,000, generally above 200,000, and apparently representing a bound form of the active factor.

(2) Compounds which dissolve the active factor in a form having a molecular weight of below about 50,000 and from which the pure active factor is preferably prepared.

The first group includes:

(1a) Tannin-binding substances, e.g. polymers such as polyvinylpyrrolidone, sorbitan mono-oleate dipolyethyleneglycol ether, and polyethyleneglycols with mean molecular weights above about 200, proteins such as gelatin, casein, and albumins, petones, caffeine, and salts such as aluminium sulphate;

(1b) Hydroxycarboxylic acids such as ascorbic acid and tartaric acid, and acylated neuraminic acids such as N-acetylneuraminic acid and N-glycolyneuraminic acid.

When solubilising agents of the first group are used, the pH of the homogenate is adjusted to 6 or higher.

The solubilising agents of the second group include:

(2a) Protamines, such as salmine (for the class of protamines see, for example, M. Florkin and E. H. Stotz, Comprehensive Biochemistry, vol. 7, Part 1, 1963, pp. 4–5);

(2b) Polypeptides prepared from basic amino acids, such as polyarginine;

(2c) Polyamines of the general Formula I

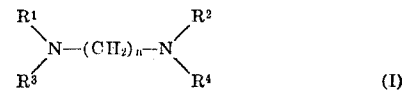

(I)

in which $n$ is an integer from 1 to 8, $R^1$, $R^2$, $R^3$, and $R^4$ may represent hydrogen, alkyl groups with not more than four carbon atoms or group II

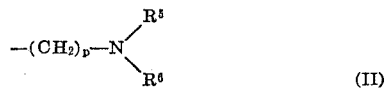

(II)

in which $p$ is an integer from 1 to 8 and $R^5$ and $R^6$ are hydrogen or alkyl groups with not more than four carbon atoms, provided that were $R^1$–$R^4$ all denote hydrogen, $n$ is greater than 1.

When solubilising agents of the second group are used, the pH of the homogenate is adjusted to 3 or above and, in fact, when protamines are used preferably to values between 6 and 10 and when polyamines are used preferably between 6 and 8.

The active amines are therefore polyamines, i.e. they contain more than one nitrogen atom. It has been found that monoamines such as diethylamine and piperidine do not dissolve the active factor. Examples of effective amines are the so-called biogenic polyamines: spermine, N,N¹-bis-(3-aminopropyl)-1,4-diaminobutane, and spermidine, N-(3-aminopropyl)-1,4-diaminobutane. Other polyamines, e.g. the amines synthesised by Von Braun and Pinkernelle, Ber. deutsch. Chem. Ges., 70 (1937), 1230–1240, with the formula $NH_2$—$(CH_2)_n$—$NH$—$(CH_2)_p$—$NH_2$, belong to the solubilising agents according to the invention. Diethylenetriamine (with $n=p=2$), for example, brings the active factor into solution, although it is less effective than spermidine. 1,2-diaminoethane and 1,4-diaminobutane can also be used; 1,2-diaminoalkanes are solubilising agents according to the invention.

Besides permine, triethylenetetramine and tris - (2-aminoethyl)-amine belong to the compounds according to the invention, and so do N-alkyl-substituted derivatives of the polyamines mentioned, such as the substances mentioned by Rometsch et al., Helv. chim. Acta, 34 (1951), 1611–1618.

The processes are carried out at low temperatures of up to 30° C., preferably at a maximum temperature of 5° C.

The constituents remaining insoluble after homogenisation are removed by centrifuging, preferably at 10,000 to 30,000$\times g$ and/or by filtration through glass. (Since the active factor is absorbed on paper, filtration through paper filters must be avoided.) If the more or less clear solution so obtained contains no physiologically unacceptable substances, it can be used as such for the products of the invention. Other dissolved substances that the extract contains, including the solubilising agent, are removed wholly or partially by methods known as such for the separation of protein materials, which gives a further concentration. Such methods are precipitation with acetone, ethanol, or ammonium sulphate, and techniques such as gel filtration and ion exchange. The purity of the concentrates can be checked electrophoretically.

These concentrates can be used in the products when any physiologically unacceptable solubilising agents have been completely removed. If desired, the concentrates can be concentrated further or evaporated to dryness at a temperature of not greater than 30° C., preferably room temperature or lower: for example, concentration or evaporation to dryness is carried out in a thin-film evaporator or by freeze-drying the frozen solution in high vacuum.

The concentrates obtained by dissolving the active factor with the aid of solubilising agents of the first group contain the active factor in a form having an isoelectric point between about 4 and 7; the form of the active factor obtained with the aid of solubilising agents of the second group has a lower molecular weight and an isoelectric point of about 9.

From a solution of the active factor obtained by means of solubilising agents of the second group, a preparation has been obtained which exhibits only one band in the analytical ultracentrifuge. This preparation, which has no taste of its own but still shows the sweetening activity, is therefore the almost pure active factor, which we shall call miraculin. The processes give a yield of up to 100 mg. of miraculin from 1 kg. of berries.

The molecular weight determined by means of the analytical ultracentrifuge is about 42,000 ($\pm$3,000). On hydrolysis, amino-acids and saccharides are formed. Saccharides have been detected in the band of miraculin after electrophoresis on polyacrylamide gel by oxidation with periodic acid and by the Schiff method. This also confirms the finding of Inglett et al. that miraculin is a glycoprotein.

The isoelectric point is about 9. Miraculin is tasteless and heat-labile, but substantially stable at pH values between 3 and 12. However, when it is allowed to stand for two hours at room temperature at a pH of 2, the sweetening activity is largely lost. It is attacked by proteases, losing the sweetening activity. Miraculin proved to be homogeneous both in sedimentation analysis in the ultracentrifuge and on gel filtration through modified dextran gels (compare P. Flodin "Dextran Gels and Their Application in Gel Filtration," published by Pharmacia, Uppsala, 1962, and, for example, Austrian patent specifications 214,413 and 223,141), while on starch gel electrophoresis at pH 4.3 and at pH 10 a weak accompanying band was found. The electrophoretic mobility in a polyacrylamide gel made from 15% of monomeric acrylamide and 0.1% of N,N'-methylene-bis-acrylamide in 0.03 M potassium acetate buffer, pH 5.0 (see Reisfeld, Nature, 195 (1962), 281; H. Determann, "Gelchromatographie," 1967, pp. 19–21) relative to hens' egg lysozyme was 0.55 ($\pm$0.02), (2 hr., 12 v./cm.).

The UV spectrum at pH 4.3 and 13 is a normal protein spectrum with a maximum at 278 nm. (pH 4.3, $E$=0.98 cm.²/mg.; $\epsilon$=41.500 cm.²/mmole, $M$=42,000) and at 283 nm. (pH 13, $E$=1.13 cm.²/mg., $\epsilon$=46,200 cm.²/mmole). The specific optical rotation in solution in 0.02 M potassium acetate buffer (pH 4.3) is $\alpha_D^{20}$=$-$30.2° (c.=0.33 g./l.). The sedimentation constant $S_{25}^0$=4.6 ($\pm$0.2) $\times 10^{-13}$ sec. (determined in 0.02 M potassium acetate buffer, pH 4.3), and the diffusion constant $D_{25}^0$—9.4 ($\pm$0.3)$\times 10^{-7}$ cm.²/sec. (determined in 0.02 M potassium acetate buffer, pH 4.3). The microbiuret method showed protein contents between 77 and 80%. The normal amino-acids were present, glycine, arginine, and lysine being qualitatively most pronounced. From UV spectrum, a tryptophan content of 2.6% and tryosine content of 3.1% were calculated. The sugar content was calculated as 21% by the carbazole method with glucose as the reference substance and as 15% with fructose as the reference substance.

Miraculin can be stored dry or in frozen solution at $-$25° C. without substantial loss of sweetening activity. Inactivation takes place slowly at room temperature and rapidly at 100° C. 0.1 mg.=2.5$\times 10^{-9}$ mole is sufficient to change a sour taste sensation into sweet.

The physiologically acceptable concentrates and miraculin itself can be added to various foodstuffs and beverages such as yoghurt, buttermilk, junket, mayonnaise, fruit juices, jam, or marmalade. The amount of concentrate or active factor to be incorporated depends on the miraculin content and on the foodstuff or other product. It can be determined rapidly by a simple test. The addition of almost pure miraculin to yoghurt, for example, in an amount of 2.5 mg./l. gives a sweet taste. With smaller amounts, the sour taste is reduced, but the sweet taste is not yet present. In berry juice, about ten times as much is needed: 20 ml./l. gives the sweet taste.

The stability of the substance in milk products is surprisingly good: after four days at room temperature or 14 days at 4° C. the same activity was found. The stability in berry juice was less good, however, which is ascribed to the lower pH of the juice (pH 2.8). Preferably, the products according to the invention have a pH value higher than 3.

Miraculin and the concentrates can also be used in acid agents for the care of the mouth and teeth. For example, its addition to the tooth-cleansing preparation the manufacture of which is described, for example, in Austrian patent specification No. 221,718 in an amount of 0.025–0.050 mg. per 1.5 g. tablet imparts a very good taste to it. Preferably the miraculin or a concentrate of it is applied in the form of a coating.

However, miraculin and the concentrates are also suitable materials for eliminating or moderating the sour taste of other types of agents for the care of the mouth and teeth that have or should have a low pH value, with the low pH value being retained.

Miraculin and the concentrates may also be used for sweetening pharmaceutical products such as vitamin C and acetylsalicyclic acid. The addition of 0.025–0.050 mg. to 100 mg. of vitamin C imparts a pleasant sweet taste to it. Tablets, dragees and the like can be made with such products, as usual.

A suitable amount of miraculin or an evaporation-dried or freeze-dried concentrate of it for sweetening a given amount of a foodstuff or beverage can be processed in a known manner with fillers, binding agents, and lubricants to form a tablet. Such tablets must disintegrate fairly rapidly in the foodstuff or other product but be sufficiently hard not to disintegrate before use.

Suitable fillers are, for example, milk powder, lactose, and starch derivatives. One tablet is sufficient, for example, to sweeten a glass of yoghurt (200–250 ml.), but the consumer can, if he wishes, use several tablets. For yoghurt or similar products it is possible to use substances which do not dissolve to form a clear solution, such as milk powder, while for clear products such as fruit juices substances dissolving to form a clear solution such as lactose are preferred. The amount of lactose to be used in a tablet is generally too small (for the lactose itself) to make the product sweet. The tablets are preferably made by direct tableting, i.e. by compressing a dry free-flowing mixture containing miraculin in the absence of moisture. Such shaped products are part of the invention and they are characterised by the fact that they contain a suitable amount of miraculin or of the dry matter from a concentrate of it to sweeten a given amount of a foodstuff or beverage.

The invention will be illustrated by means of the following examples.

EXAMPLE 1

1.1–2.2 g. of fruit flesh (wet weight) from 2–4 g. of berries of *Synsepalum dulcificum* was homogenised with a 1% solution of polyethyleneglycol (mean molecular weight 20,000) in water. The pH of the homogenate was brought to 7 with a saturated sodium carbonate solution. Finally it was centrifuged at $10,000 \times g$ for 30 min.

The liquid obtained in this way was treated at 20° C. with an equal volume of acetone with stirring. The precipitated active factor was centrifuged off for 10 min. at $1,200 \times g$. The precipitate was washed with two volumes of acetone-water (2:1) and taken up in 6 ml. of 0.1 M potassium phosphate buffer, pH=7. Insoluble material was centrifuged off at $10,000 \times g$ (30 min.). The resulting solution, when added to one litre of yoghurt, imparted a pleasant sweet taste to this product.

The same result was obtained by extraction with a 5% solution of polyethyleneglycol (mean molecular weight 400) in water, 1% of caffeine in 0.1 M potassium phosphate, pH 7, 0.1% of sorbitan mono-oleate dipolyethyleneglycol ether in 0.1 M potassium phosphate, pH 7, and with 3% of peptone in water.

EXAMPLE 2

4.4–8.8 g. of fruit flesh (wet weight) from 8–16 g. of berries was homogenised with 20 ml. of a 1% gelatin solution in water or in 0.1 M potassium phosphate buffer, pH=7. The pH of the homogenate was brought to 7 with a dilute KOH solution, after which the mixture was centrifuged for 30 min. at $10,000 \times g$.

The solution obtained in this way was used (see Example 11).

The solution obtained was purified further by gel filtration through Sephadex G–25, a modified dextran (see H. Determann, "Gelchromatographie," 1967, particularly p. 28). The Sephadex was swollen with water and filled into a $3 \times 11$ cm. column (volume of the bed 78 ml.). The solution of the active factor (about 25 ml.) was percolated through the column with water at a rate of flow of 150 ml./hr. The eluate with elution volumes 25 to 50 ml. inclusive contained the active factor; it was used in this form for sweetening purposes (see Example 11).

EXAMPLE 3

1.1–2.2 g. of fruit flesh (wet weight) from 2–4 g. of berries was homogenised with 5 ml. of a 2% aqueous solution of sodium caseinate, pH=10. The homogenate was centrifuged at $10,000 \times g$ for 30 min. The active supernatant so obtained was brought to pH 4 with dilute acid, and the precipitated casein was centrifuged off at $10,000 \times g$ for 30 min. The resulting solution contained the active factor and was used as such (see Example 12).

EXAMPLE 4

The flesh from 2 g. of berries (1.1 g. of flesh, wet weight) was homogenised with 5 ml. of a 0.01% solution of N-glycolylneuraminic acid in water. The pH of the resulting homogenate was brought to 8 with a concentrated sodium bicarbonate solution, after which the mixture was centrifuged at $10,000 \times g$ for 30 min. The solution was suitable for the purposes given (Example 13).

The extraction took place similarly with a 5% solution of ascorbic acid in water.

EXAMPLE 5

2.2 g. of the fruit flesh, wet weight, was homogenised with 5 ml. of a 1% solution of salmine sulphate in water. After homogenisation, the pH of the mixture was 3 to 3.5. The resulting mixture was centrifuged at $10,000 \times g$ (30 min.).

Similar results were obtained when the pH of the mixture after homogenisation but before centrifuging was brought to values of up to 10. The pH value required for the further treatment of the extract can therefore be adjusted before or after the insoluble constituents are centrifuged off.

The extract obtained in this way contained a large amount of salmine, which was removed either by ion exchange or by gel filtration.

Removal of the salmine by ion exchange

The pH of the solution was adjusted to about 10, and the solution was percolated through a column of CM-Sephadex C–50, a carboxymethyl derivative of modified dextran (cf. Austrian patent specification 223,141 and the publications of the patentees, Pharmacia AB, Uppsala), which possesses cation-exchanging properties.

The CM-Sephadex C–50 was washed with 0.02 M sodium glycinate buffer (pH 10.5) and filled into a column ($1 \times 34$ cm., volume of the bed 27 ml.). The solution of the active factor was added to the column and was percolated with the same buffer at a rate of flow of 25 ml./hr. The active factor was present in the eluate with elution volumes of 16 to 35 ml., inclusive. The solution was free from salmine (according to starch gel electrophoresis at pH 4.3).

This solution was used (see Example 14).

Removal of the salmine by gel filtration

The solution of the active factor was brought to pH 7, after which sufficient solid NaCl was added to it to make it 0.1 M in NaCl. 1 ml. of this mixture was subjected to gel filtration through Sephadex G–50, being eluted with a 0.1 M solution of NaCl in 0.02 M potassium phosphate buffer, pH=7, from a 1.5×21 cm. column (volume of the bed=36 ml.) (rate of elution 20 ml./hr.). The eluate with elution volumes of 13 to 19 ml., inclusive, contained the active factor and that with elution volumes of 20 to 31 ml., inclusive, contained the salmine. The solution of the active factor obtained in this way was freed from salts by filtration through a water-washed column of Sephadex G–25. It could be used as such.

EXAMPLE 6

2.2 g. of fruit flesh, wet weight, was homogenised with 5 ml. of a 2% solution of triethylenetetramine in water. The homogenate was brought to pH=7 with acetic acid and was centrifuged at 28,000×g for 30 min. (20° C.). 2 ml. of the supernatant was transferred to a water-washed column of Sephadex G–25 (1.5×20 cm.; volume of the bed 39 ml.) and eluted with water (20 ml./hr.). The active factor was found in the eluate with elution volumes of 18 to 26 ml., inclusive, and was free from amine (according to the ninhydrin reaction). The resulting solution could be used as such.

Extraction with spermidine and other water-soluble polyamines took place similarly.

EXAMPLE 7

88 g. of flesh (wet weight) from 160 g. of berries was homogenised with 200 ml. of a 2% spermine solution. The homogenate was brought to pH 7 with dilute acetic acid and was centrifuged at 28,000×g for 30 min. (at 20° C.).

Solid ammonium sulphate was added to the resulting solution (250 ml.) at 0° C. at the rate of 24.3 g. per 100 ml. (40% ammonium sulphate saturation), and the pH was restored to 7 with a few drops of concentrated NaOH solution (e.g. 30% NaOH). After 30 minutes stirring at 0° C., the precipitate that had been formed was centrifuged off at 20,000×g (30 min.; 0° C.). Then solid ammonium sulphate was added to the supernatant (270 ml.) at the rate of 13.2 g. per 100 ml. (60% ammonium sulphate saturation) and this was treated in the same way as the above solution (pH brought to the desired value, stirred, centrifuged). The precipitate so obtained was taken up in 25 ml. of water, and the small amount of insoluble material was centrifuged off at 20,000×g (15 min.: 0° C.). The supernatant so obtained contained the bulk of the active factor originally present. It was transferred to a water-washed column of Sephadex G–50 (5×95 cm., volume of the bed=1900 ml.) and eluted with water at a rate of flow of 50 ml./hr. The eluate with elution volumes of 1600 to 1800 ml., inclusive, was freeze-dried, and the residue was taken up in 2 ml. of 0.06 M potassium acetate buffer, pH 4.3. The insoluble material was removed by centrifuging (20,000×g, 15 min., 0° C.), and the solution was transferred to a water-washed column of Sephadex G–25 (2×42 cm., volume of the bed 132 ml.). The column was eluted with water (25 ml./hr.) and the eluate from 56 to 75 ml. was collected and freeze-dried. This yielded 14 mg. of almost pure miraculin. The properties of miraculin given in the specification were determined with this sample.

In place of spermine, other water-soluble polyamines can be used: the working up of an extract obtained with triethylenetetramine gave the same result.

EXAMPLE 8

0.5–2.5 mg. of almost pure miraculin was added to 1 litre of yoghurt. The smaller amounts gave a weakening of the sour taste and the larger amounts gave a pleasant sweet taste.

The same taste effect was present after 4 days at room temperature and also after 14 days storage at 4° C. in the refrigerator.

The same effect was achieved by the addition of the same amounts of 1 litre of buttermilk or 250 g. of junket (crude sour skim-milk cheese).

EXAMPLE 9

1 mg. of almost pure miraculin was added to 1 kg. of mayonnaise. The sour taste was reduced, which was considered to give a pleasant product.

EXAMPLE 10

The same result as in Example 6 was achieved by the addition of 2.5–12.5 ml. of the extract obtained with polyethyleneglycol having a mean molecular weight of 20,000, as described in Example 1.

EXAMPLE 11

The same results as in Example 8 were achieved by the addition to yoghurt of 2.5–12.5 ml. of the gelatin extract and also the solution of the gelatin extract purified by gel filtration as described in Example 2.

EXAMPLE 12

The addition of the same amount of the casein extract as described in Example 3 to yoghurt gave the same results.

EXAMPLE 13

5–25 ml. of the N-glycolylneuraminic acid extract as described in Example 4 was added to 1 litre of yoghurt. The same effect on the taste as in Example 8 was found.

If desired, the solution of the extract can first be concentrated or evaporated, the boiling point being kept below 30° C. The solution is best freeze-dried under high vacuum.

EXAMPLE 14

The same results as in Example 13 were achieved with the solution obtained by ion-exchange of the salmine extract as described in Example 5.

EXAMPLE 15

2.5 mg. or 5 mg. of miraculin was dissolved in 10 ml. of water. 0.1 ml. portions of the resulting solution were applied as coatings to tablets weighing 1.5 g. made according to Example 9 of Austrian patent specification 221,718, with the saccharin omitted. The tablets were dried in a dry atmosphere. The tablets had a very good taste.

EXAMPLE 16

12.5 ml. or 25 ml. of the purified gelatin extract obtained as described in Example 2 was concentrated to 10 ml., or the residue of the freeze-dried solutions was dissolved in 10 ml. 1.5 g. tablets prepared according to Example 8 of Austrian patent specification 221,718 with the omission of the saccharin were each coated with 0.1 ml. portions of the resulting solution. After drying, the tablets had a very good taste.

EXAMPLE 17

1 g. of vitamin C powder was well mixed with 0.25 or 0.50 mg. of miraculin. Both mixtures had a very pleasant sweet taste.

EXAMPLE 18

25 mg. of almost pure miraculin was well mixed with 4.5 g. of lactose and 0.5 g. of water-soluble potato starch dextrin. Tablets each of 50 mg. were moulded from this mixture by the dry method. One tablet was sufficient to sweeten a 200–250 ml. glass of yoghurt.

What is claimed is:

1. A process for extracting a solution of concentrated miraculin from the berries of *Synsepalum dulcificum* which comprises treating the berries at a temperautre of up to about 30° C. and at a pH of at least 6 with an aqueous solution of a substance selected from the group consisting of polyvinylpyrrolidone, sorbitan mono-oleate, dipolyethyleneglycol ether, polyethylene glycols having a molecular weight above about 200, gelatin, casein, albumin, peptones, caffeine, aluminum sulphate and hydroxycarboxylic acids; and, separating the resulting miraculin-containing solution from the insoluble constituents.

2. A process as defined in claim 1 wherein the separation of the miraculin-containing solution from the insoluble constituents is effected by centrifuging.

3. A process as defined in claim 1 wherein the hydroxycarboxylic acid is selected from the group consisting of ascorbic acid, tartaric acid, N-acetylneuraminic acid and N-glycolylneuraminic acid.

4. A process as defined in claim 1 wherein the separated resulting miraculin-containing solution is treated with protein precipitants to remove at least a part of the nonmiraculin substances.

5. A process as defined in claim 1 wherein the separated resulting miraculin-containing solution is treated by gel filtration to remove at least a part of the nonmiraculin substances.

6. A process as defined in claim 1 wherein the separated resulting miraculin-containing solution is treated by ion exchange to remove at least a part of the nonmiraculin substances.

7. A process for preparing a solution of miraculin which comprises treating the berries of *Synsepalum dulcificum* with an aqueous solution of a substance selected from the group consisting of protamines, polypeptides prepared from basic amino acids, and polyamines of the general Formula I:

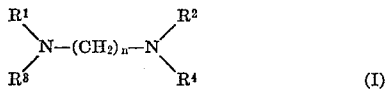

in which $n$ is an integer from 1 to 8, $R^1$, $R^2$, $R^3$, and $R^4$ represent hydrogen, alkyl groups with not more than four carbon atoms or group II.

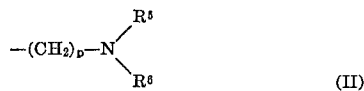

in which $p$ is an integer from 1 to 8 and $R^5$ and $R^6$ are hydrogen or alkyl groups with not more than four carbon atoms, provided that where $R^1$–$R^4$ all denote hydrogen, $n$ is greater than 1, at a pH value of at least 3 and a temperature below 30° C. and separating the resulting miraculin-containing solution from insoluble constituents.

8. A process as defined in claim 7 wherein separation from insoluble constituents is effected by centrifuging.

9. A process as defined in claim 7 wherein the protamine is salmine.

10. A process as defined in claim 7 wherein the polypeptide is polyarginine.

11. A process as defined in claim 7 wherein the polyamine is selected from the group consisting of spermine, spermidine, diethylenetriamine, 1,2-diaminoethane, 1,4-diaminobutane, triethylenetetramine and bis(2-aminoethyl)-amine.

12. A process as defined in claim 7 wherein the separated resulting miraculin-containing solution is treated with protein precipitants to remove at least a part of the nonmiraculin substances.

13. A process as defined in claim 7 wherein the separated resulting miraculin-containing solution is treated by gel filtration to remove at least a part of the non-miraculin substances.

14. A process as defined in claim 10 wherein the separated resulting miraculin-containing solution is treated by ion exchange to remove at least a part of the non-miraculin substances.

References Cited

Journal of Agricultural and Food Chemistry, vol. 13, 1965, pp. 284–287, Inglett et al.

Science, vol. 161, September 1968, pp. 1241–1243, Kurihara et al.

Nature, vol. 220, October 1968, pp. 373–374, Brouwer et al.

HOWARD E. SCHAIN, Primary Examiner

U.S. Cl. X.R.

99—54, 59, 102, 105, 141 A; 424—359